United States Patent
Elliott

(10) Patent No.: US 6,775,709 B1
(45) Date of Patent: Aug. 10, 2004

(54) MESSAGE ROUTING COORDINATION IN COMMUNICATIONS SYSTEMS

(76) Inventor: Brig Barnum Elliott, 25 Wollaston Ave., Arlington, MA (US) 02476

( * ) Notice: Subject to any disclaimer, the term of this patent is extended or adjusted under 35 U.S.C. 154(b) by 0 days.

(21) Appl. No.: 09/503,143

(22) Filed: Feb. 15, 2000

(51) Int. Cl.[7] .............................................. G06F 13/00
(52) U.S. Cl. ........................ 709/238; 709/242; 709/224; 709/228
(58) Field of Search ................................ 709/238, 242

(56) References Cited

U.S. PATENT DOCUMENTS

| | | | |
|---|---|---|---|
| 4,718,002 A | | 1/1988 | Carr ............................ 364/200 |
| 5,093,824 A | | 3/1992 | Coan et al. .................... 370/16 |
| 5,101,348 A | * | 3/1992 | Arrowood et al. .......... 709/242 |
| 5,243,592 A | | 9/1993 | Perlman et al. ............... 370/17 |
| 5,671,357 A | * | 9/1997 | Humblet et al. ............ 709/242 |
| 5,802,316 A | * | 9/1998 | Ito et al. ...................... 709/249 |
| 5,850,592 A | | 12/1998 | Ramanathan .................. 455/7 |
| 5,881,246 A | * | 3/1999 | Crawley et al. ............. 709/238 |
| 5,884,047 A | * | 3/1999 | Aikawa et al. ............. 709/238 |
| 5,913,921 A | | 6/1999 | Tosey et al. ................ 709/220 |
| 6,002,674 A | * | 12/1999 | Takei et al. .................. 370/254 |
| 6,574,197 B1 | * | 6/2003 | Kanamaru et al. .......... 370/352 |

OTHER PUBLICATIONS

"Link–State Routing," John Moy, Ch. 5, "Routing in Communications Networks," ed. Martha Steenstrup, Prentice Hall, 1995.

"Packet Radio Routing," Gregory S. Lauer, Ch. 11, "Routing in Communications Network," ed. Martha Steenstrup, Prentice Hall, 1995.

"Packet Radio Network Routing Algorithms: A Survey," J.J. Hahn et al., IEEE Communications Magazine, vol. 22, No. 11, Nov. 1984, pp. 41–47.

"The Organization of Computer Resources into a Packet Radio Network," R.E. Kahn, IEEE Trans. On Communication, vol. COM–25, No. 1, Jan. 1977, pp. 169–178.

"Analysis of Routing Strategies for Packet Radio Networks," J.J. Garcia Lune Aceves et al., Proc. Of the IEEE INFOCOM '85, Washington, DC, Mar. 1985, 292–302.

"The DARPA Packet Radio Network Protocols," J. Jubin et al., Proc. of the IEEE, vol. 75, No. 1, Jan. 1987, pp. 21–32.

* cited by examiner

*Primary Examiner*—Rupal Dharia
*Assistant Examiner*—April L Baugh
(74) *Attorney, Agent, or Firm*—Ropes & Gray LLP

(57) ABSTRACT

A network routing device has a timing unit that sets times for issuing a network information update message to one or more other routing devices in the network. A message receiver receives a message from the one or more other routing devices that includes network information of the one or more other routing devices. The time of issuance of the network information update message from the routing device is determined in response to the received message and the state of the timer so that the router's time of issuance is synchronized to the receiving of the network information message.

45 Claims, 6 Drawing Sheets

MESSAGE ROUTING COORDINATION IN COMMUNICATIONS SYSTEMS

BACKGROUND OF THE INVENTION

1. Field of the Invention

The invention relates to routing of messages, in a communication system and, more particularly, to arrangements for issuing network information messages among routers in a communication network.

2. Related Art

In a communication system in which communications among subscribers traverse a network of routers or switches to provide required communication paths, distributed protocols may be used to determine paths through which data messages should be forwarded through the network. The distributed protocols provide an arrangement in which individual routers or switches in the network issue network information update messages on network topology, address information and/or traffic flow pertaining to the individual routers. Messaging is arranged so that each router or switch receives network information messages and network information update messages propagated through the network from other routers or switches and issues its own network information update messages to other routers or switches. The network information updates and/or processing results derived from the network information and updates for each router or switch are stored in databases associated with the router or switch.

An example of a distributed protocol is the Open Shortest Path First (OSPF) routing protocol. As described in U.S. Pat. No. 5,881,246 issued to Eric S, Crawley et al. Mar. 9, 1999, each router running the OSPF protocol maintains an identical database describing the network topology. With the same network topology database, each router is able to generate a routing table by forming a shortest-path tree with itself at the root of the tree. The OSPF protocol detects changes in network topology and recalculates paths based on the changed topology. Using the OSPF protocol, each router generates messages such as link state advertisements (LSA) describing the local state of its links. The message is issued from the router to the other routers of the network via its links to neighboring routers.

Since the network connections change according to communication requirements, the issued network information and updates may only be applicable for relatively short time periods owing to changes in network configuration. In an example, a network of mobile routers or nodes changes its configuration very frequently as the routers move and connections among the routers are established and/or lost. As a result of the changes in network configuration, the stored network information and updates have only a limited lifetime and must be frequently refreshed.

Each individual router or switch in the communication network issues its network information update messages for use by other routers or switches. Generally, the updates from a router are issued periodically. Network information messages are also issued in response to an external event requiring a message with different content or when there is an indication of a change in status of the individual router or switch. Timing of issuance of network information messages in known systems is controlled by internal timers in the individual routers so that the issuance times of each router are independent of the issuance timing of the other network routers. In some arrangements, random jitter is added to the update issuance times to avoid coordination of issuance. As a result of the independently timed update messaging among routers, updating of network information in a network of plural routers may be uncoordinated so that the resulting delays in propagation of update messages may interfere with the proper setup of communication paths.

SUMMARY OF INVENTION

The invention is directed to a communication system in which plural routing devices are coupled together to form a network for communications among plural subscribers. At times that are determined internally in the individual routing devices, a routing device generates and issues an update message that includes network information of the routing device. The network information update message is sent to other routing devices in the network and network information update messages are received from other routing devices. The received network information is processed in the routing device to produce a representation of the network topology and traffic flow is controlled in response to issued messages.

According to the invention, a routing device in the network receiving a network information message from another routing device advances the timing of issuance of its next update message according to the state of the internal timing so that the time of issuance of the next update message is coordinated with the receipt of the network information message from the another router.

According to one aspect of the invention, a routing device includes a timing unit that controls the issuance of network information update messages. When a network information message is received from another routing device, the time of issuance of the next network information update message is determined on the basis of the state of the timer. In this way, the issuance of the next network information update message is synchronized to the incoming network information message.

According to yet another aspect of the invention, the network information message issued by a routing device is received by a plurality of other routing devices. The receipt of the message triggers the issuance of network information update messages by the other routing devices so that the issuance times of the other routing devices is synchronized with respect to the received message.

According to yet another aspect of the invention, the messages received from the plural routing devices by a routing device are processed to form set of parameters that are stored in the receiving routing device. The parameters include a representation of the topology of the network.

According to yet another aspect of the invention, the network information message issued by each routing device is a network information update issued at a time determined by information such as a predetermined network change in a received network information message and the state of the timing unit controlling issuance.

According to yet another aspect of the invention, the network information message issued by a routing device also includes network information of other routing devices.

The invention will be better understood from the following more detailed description taken with the accompanying drawings and the claims.

DETAILED DESCRIPTION OF THE PREFERRED EMBODIMENTS

Figure 1:
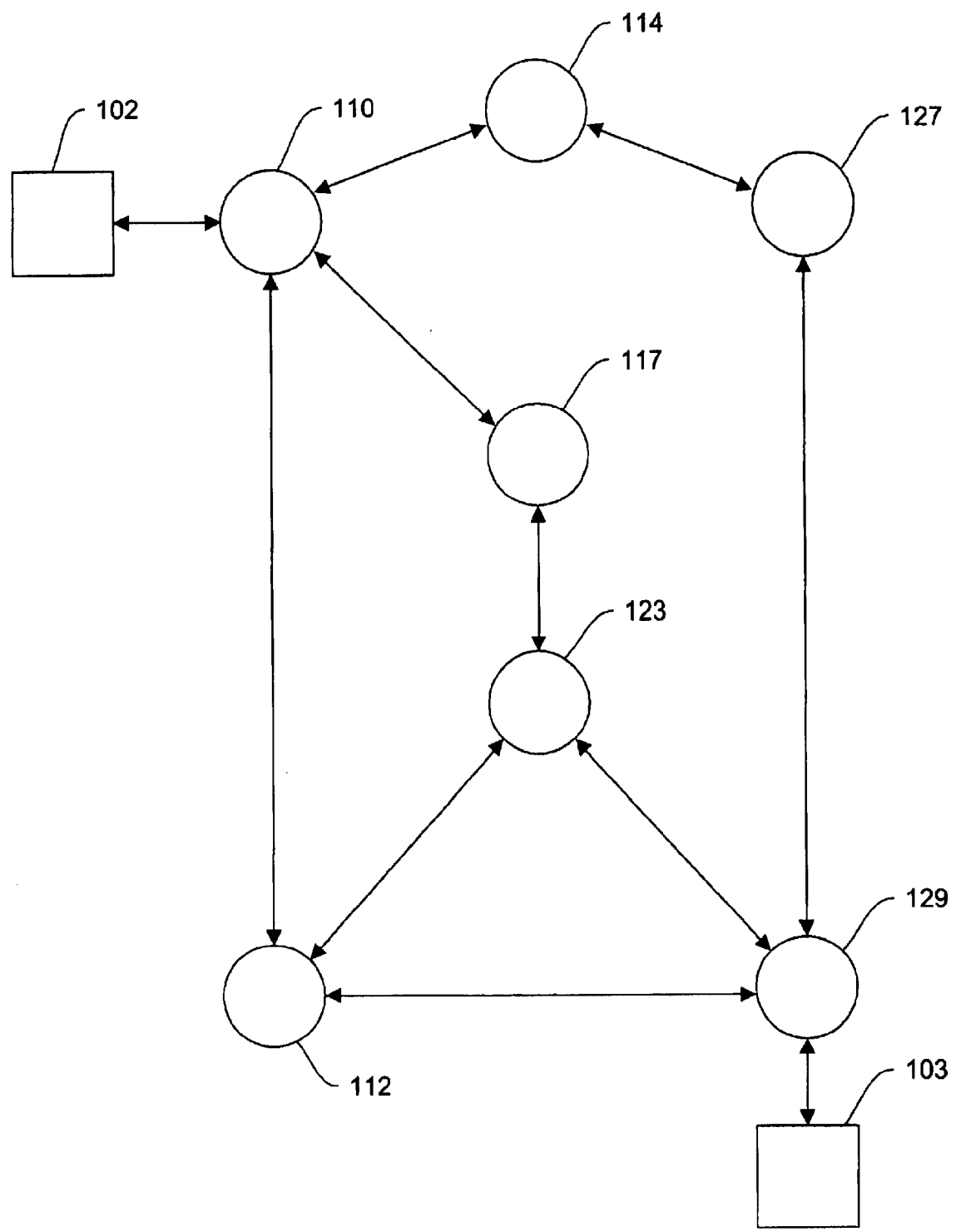
FIG. 1 depicts a general block diagram of a communication network which employs the invention.

FIG. 1 depicts a communication network for communicating data among units coupled through linked routers. In FIG. 1, each of a set of switches or routers 110, 112, 114, 117, 123, 127 and 129 is linked to other routers in the set to form a communication network. The network provides a communication path from a data unit source such as a data unit 101 coupled with the router 110 to a data unit destination such as a data unit 103 coupled to the router 129. Other routers of the set shown in FIG. 1 may have data units of various types connected thereto.

The communication paths through the network of FIG. 1 are determined by the network routers based on network information received from the other routers of the network. The received network information is processed in each router to generate a database representing the topology of the network. When a request from the data unit 101 to send data to the data unit 103 is received by the router 110, a communication path from the router 110 to the router 129 is set up based on the network topology databases stored in the routers of the network. In this way, the source data unit 101 and the destination data unit 103 are coupled together through the network. If the network of FIG. 1 has mobile type routers coupled together by wireless links, the links among the routers at nodes of the network change frequently due to movement of the mobile routers and to environmental factors. Accordingly, frequent messaging among the routers is required to maintain the network topology databases in the nodes updated.

Figure 2:
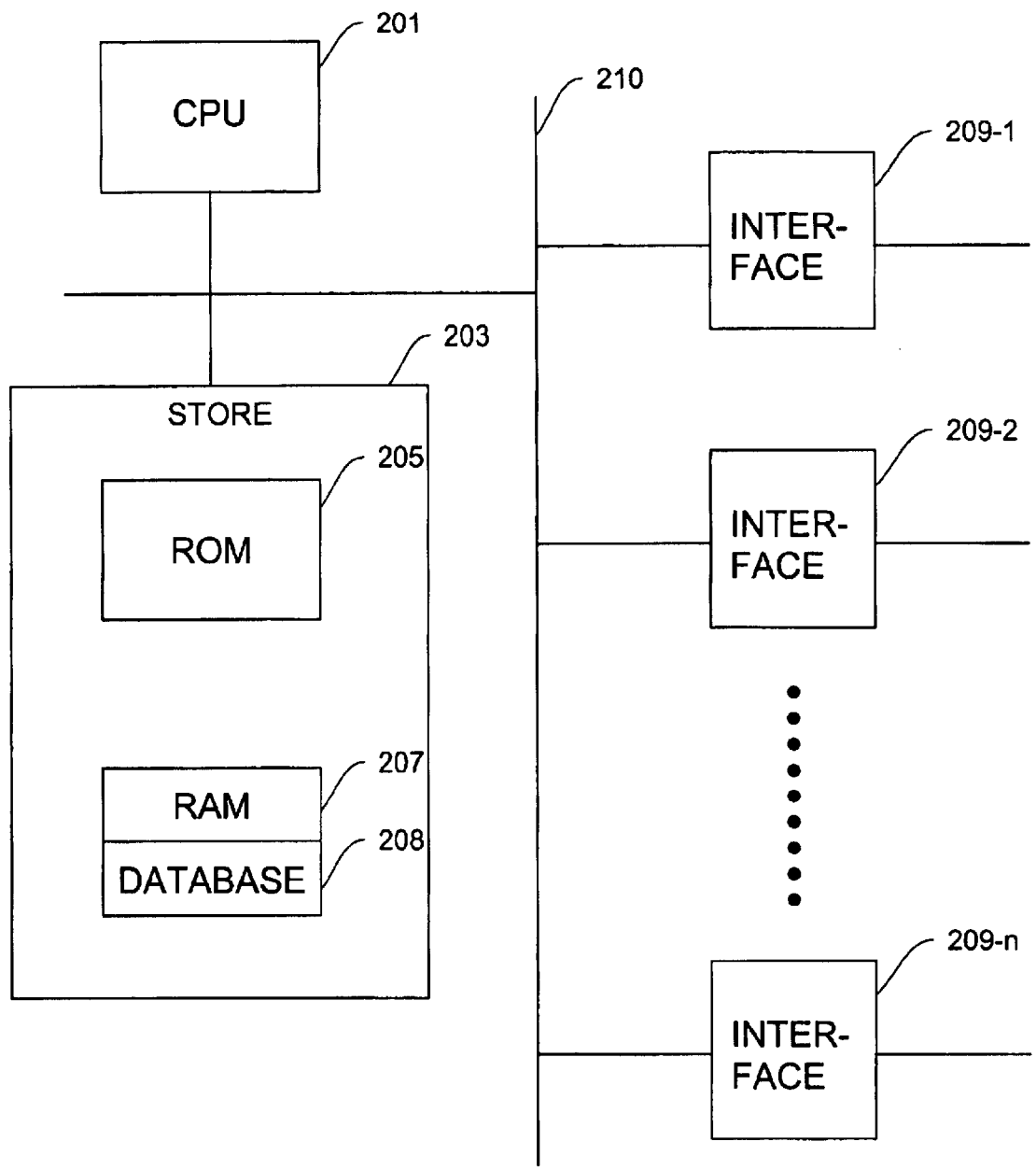
FIG. 2 depicts a block diagram of a router in the communication network of FIG. 1.

FIG. 2 illustrates the structure of a router such as the router 117.

Referring to FIG. 2, the router includes a CPU 201, a store 203, interfaces 209-1 through 209-n and a bus 210. The store 203 includes a ROM 205 which stores coded program units for control of the router, a RAM 207 which stores information for operation of the router and a network information database 208 that includes a representation of the present network topology and a router update database.

Each router in the network of FIG. 1 is initialized when activated by receiving messages from neighboring routers with which it is linked through a connecting interface. For example, the router 117 may be connected to the router 110 through the interface 209-1 and to the router 123 through the interface 209-2. A message received by the router 117 from the router 110 through their link includes codes corresponding to network links stored in the database of the router 110. Similarly, messages received by the router 117 from the router 123 include codes corresponding to network links stored the databases of these neighboring routers. The received messages from neighboring routers 110 and 123 are processed by the CPU 201 of the router 117 and a representation of the network topology is generated and stored in the database 208 of the router 117. Upon a request for a communication path between the data unit 101 and the data unit 103 from the router 110, the same network topology information stored in the databases of all the network routers is used to set up the most appropriate communication path.

The network topology representations in the router databases provide the information to set up communication paths. Since the network configuration may change frequently, each router must receive the latest network information from its linked neighbors to maintain an updated network topology representation in its database and must update the linked neighbors on its status and links. The distribution of network information is accomplished by sending of network information messages from router to router through their links.

In some distributed network protocols, routers or switches in a network issue soft-state updates of limited lifetime which are propagated through the network to other routers and switches. The results of the updates are stored in the databases of the other routers until the lifetime expires at which time the update or its results is discarded. The updates may be propagated throughout the network without substantial modification as in link state protocols. The updates may be processed at the routers as they pass through the network with only the processed results being forwarded into the network as in Distance Vector Routing, many multicast routing protocols, etc.

Figures 3A, 3B:
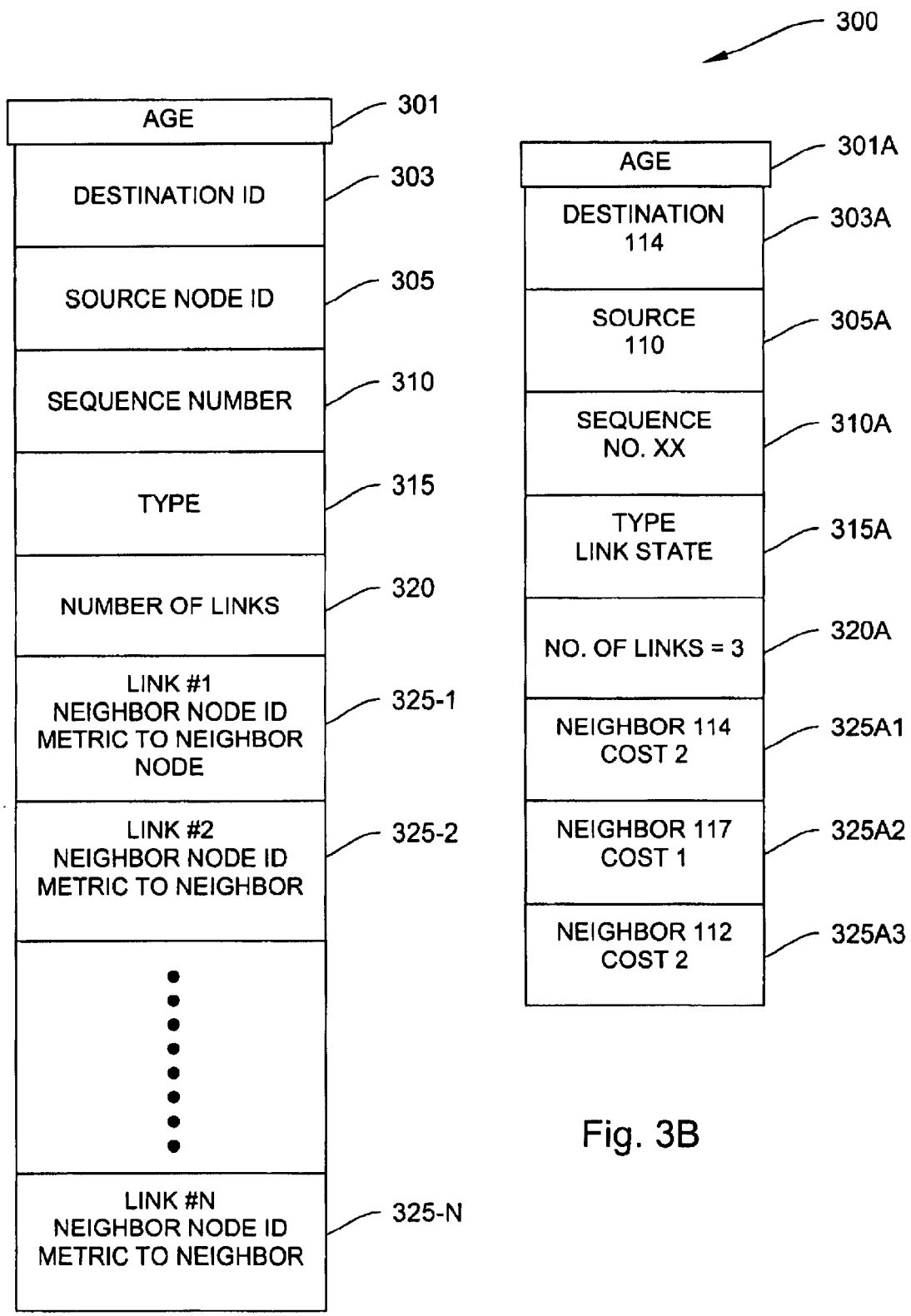
FIG. 3A illustrates a network information message for routing in the network of FIG. 1.
FIG. 3B illustrates a link state message for a router in FIG. 1.

FIG. 3A shows a form of a link state message 300 that is transmitted from one router to a linked neighbor. In the message of FIG. 3A, an item 301 of the message 300 is an age indication from which the lifetime of the message may be judged. An item 303 of the message 300 is a destination node identification code identifying the router that is to receive the message. An item 305 is a source node identification code identifying the router that is to receive the message. An item 310 is a sequence number code which is a unique sequence number issued by the source node that identifies the position of this message within the stream of messages emanating from that node. An item 315 is a code identifying the type of message, e.g., link state type or affiliation type. An item 320 is a code identifying the number of links in service from the source node to its neighbor nodes. Items 325-1 through 325-N are codes identifying in-service links from the source node to its neighbor nodes. Each of links 325-1 through 325-N includes the neighbor node identification and a metric giving the cost of the node in a communication path.

If the message is a link state message to be sent from the router 110 to the router 114 in FIG. 1, the destination code corresponds to the router 114 shown as item 303A in FIG. 3B, the source code corresponds to the router 110 shown as item 305A, the sequence number code shown as item 31A, the type is "link state" shown as item 315A and the number of links is 3 shown as item 320A. An item 301A of the message is an age indication. Item 325A1 contains a code corresponding to the linked router 114 and a metric of 2 for the cost of using a path through the router 114. Item 325A2 contains codes corresponding to the linked router 117 and a metric of 1. Item 325A3 contains codes corresponding to the linked router 112 and a metric of 3. When the message from the router 110 is received in the router 114, the database in the router 114 is updated with the latest information about the network links of the router 110. The link state message from the router 110 may also include other network link state information previously received by the router 110 from other routers. The propagation of messages among the routers of the network of FIG. 1 provides each router with updated network information with which it can update the network topology representation stored in its database.

Whenever, the topology of a network such as shown in FIG. 1, changes, e.g., a router or node enters or leaves the network or whenever a communication link switches between an operational state and a non-operational state, one or more routing updates are generated by the routers affected by the change. For example, if the link between the router 112 and 129 is becoming or has become non-operational, the routers 112 and 129 report the change to the router 123. Upon receiving the updates from the routers 112 and 129, the router 123 generates an update reflecting these changes that is propagated or flooded throughout the network through its linked neighbors. When the message from router 123 is received, it is processed and its contents are added to the local routing database of the recipient routers. The update information received from plural routers is combined to form an update message in the recipient router for flooding through the network. The flood update is propagated to the network so that the new routing information reaches all the routers in the network.

Figure 4:
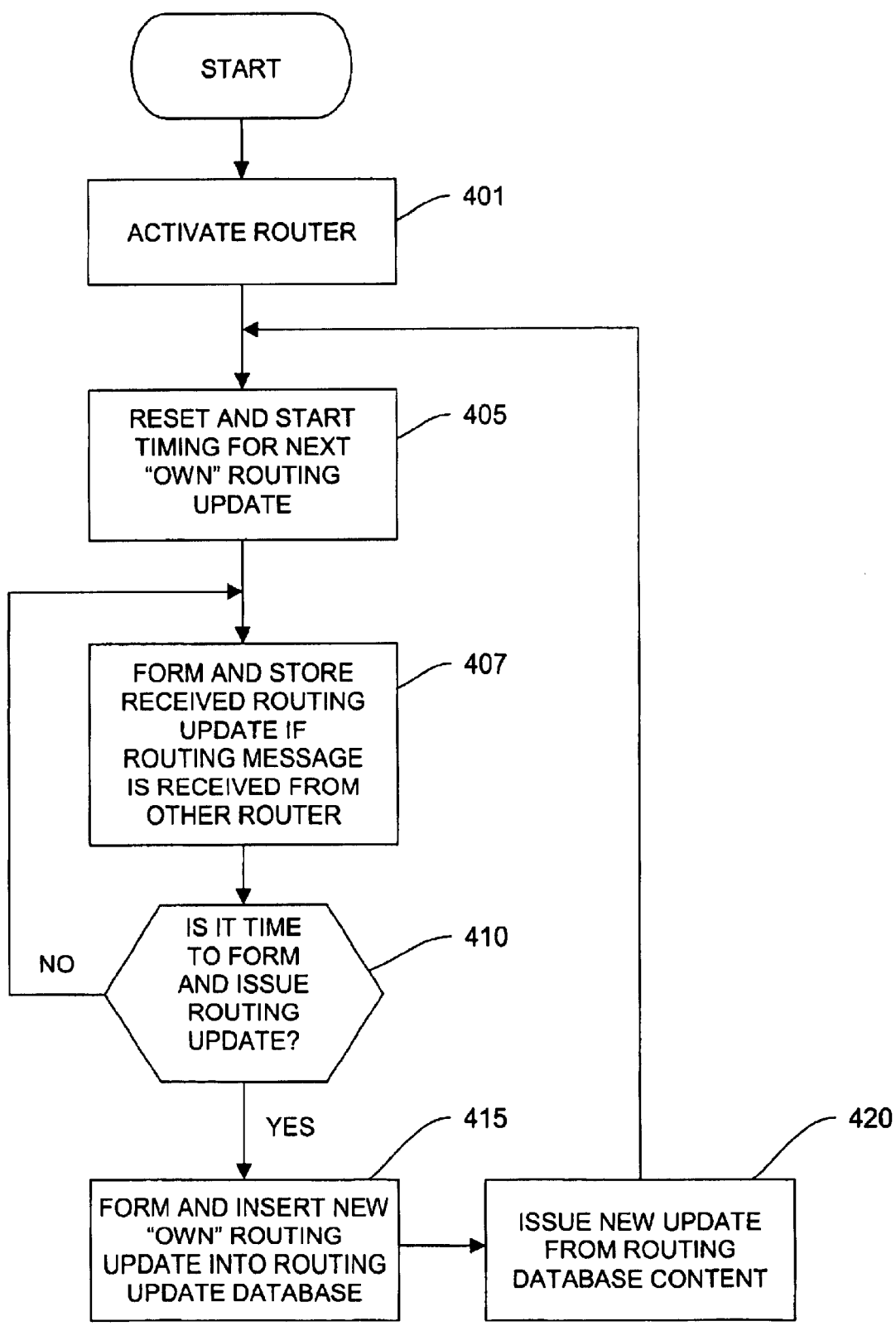
FIG. 4 depicts a flow chart illustrating message routing according to the prior art.

FIG. 4 is a flow chart illustrating the updating of network information. In accordance with known arrangements, each router forms and issues a routing message in response to an external event requiring a message with different content or in response to expiration of an internally timed period which triggers the reissuing of a refreshed copy of the current message. Referring to FIG. 4, a router such as the router 110 in FIG. 1 is activated for connection to the network in step 401 in a manner well known in the art. As part of the activation process of step 401, the router 110 recognizes its links to its neighbor routers 112, 114 and 117 and sends a routing message to each of these routers such as illustrated with respect to the router 114 in FIG. 3B.

Step 405 is then entered wherein timing of a timing arrangement of the CPU 201 of the router 110 until the formation and issuance of the next routing update of the router is started. Control is passed to the loop including decision step 407 in which a received routing update is formed and inserted into the database 208 of the router 110 and decision step 410 in which it is determined a whether it is time to form and issue the "own" routing update. When the time for forming and issuing the "own" routing update arrives, step 415 is entered in which the new "own" routing update is formed and inserted into the database 208. In step 420, the new update is issued from information stored in the routing update database and control is returned to step 405 to start the next timing period. Since the internal timing of each router is independent of the internal timing of the other routers of the network, the issuing of routing updates among the network routers is uncoordinated so that there may be long delays in propagating network information.

Figure 5:
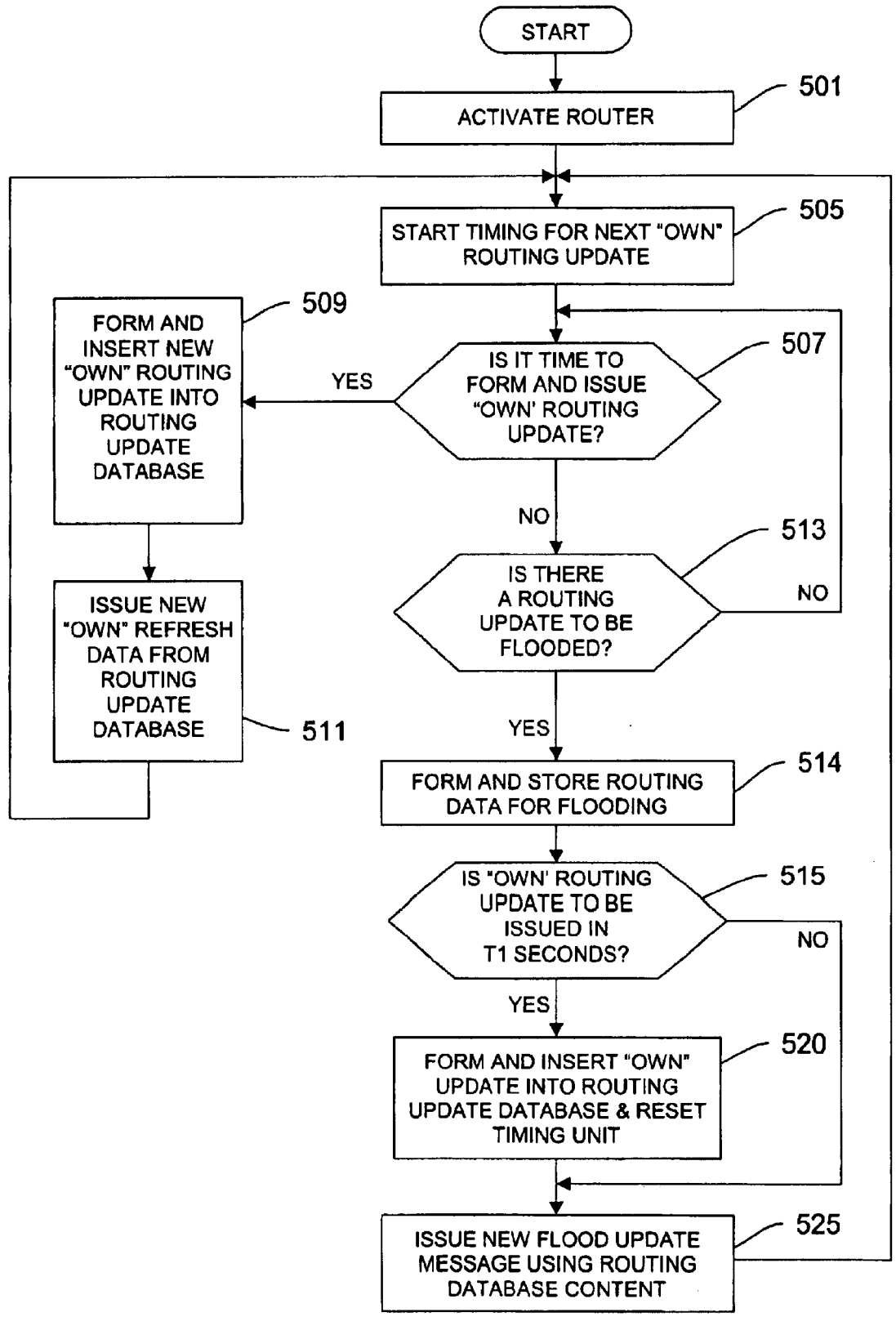
FIG. 5 depicts a flow chart showing a message routing arrangement according to one embodiment of the invention.

FIG. 5 is a flow chart illustrating an embodiment of the invention in which issuing of link state messages is coordinated to substantially reduce the time required for propagation of network information among the routers of the network of FIG. 1. In FIG. 5, a router, e.g., the router 110, is activated in step 501. As disclosed with respect to FIG. 4, the activation of a router includes recognition of the active neighboring routers linked to it. Network information update messages such as routing updates are then triggered according to a timing arrangement in CPU 201. In this way, updates of network information in the routing update database of the router 110 are propagated to the other routers of the network so that a the most current network topology is available at each router.

After activation, the timing arrangement in the CPU 208 of the router 110 is started for issuance of the next own routing update of the router in step 505. Decision step 507 is then entered from step 505 and it is decided therein whether it is time to form and issue the router's own routing update. If the time for forming and issuance of the router's routing update has arrived, control is transferred to step 509 in which a routing update is formed and inserted into the routing update database of database 208. The routing update in the database is issued to the neighbor routers 112, 114 and 117 in step 511 and control is returned to step 505 in which timing is started again.

If there is a "NO" decision in step 507, step 513 is entered in which it is determined whether there is a routing update to be flooded e.g., as a result of detecting receipt a network information or network information update message from another router. When no such network information message is received, step 507 is reentered. As long as the time for issuance of its own routing update has not arrived and no flooding of a routing update is detected as required, the loop of steps 507 and 513 is iterated.

Upon receiving a network information or update message in step 513, the routing data for flooding is formed and stored in the routing database in step 514. Step 515 is then entered and it is decided whether the router's own routing update is to be issued within a time T of the time to form and issue the own routing update. If "NO", a flood update message is issued using the content of the routing database. Detection of the router's own routing update to be issued within the time T in step 515 transfers control to step 520 in which the router's "own" update is formed and inserted into the routing update database and the timing started in step 505 is reset. Step 525 is then entered wherein the new flood update message using the routing database content is issued and control is returned to the timing starting step 505.

According to the invention, the time of issuance of a network information update message depends on the state of the update message timing in the router. When the timing state is such that the time for issuance of the next routing update message has arrived, the router's own routing update data in the routing update database is issued. If a routing update for flooding has been received and the state of the timing is such that it is prior to a predetermined time before the next routing update message is scheduled, the issuance time is advanced and a message based on the data for flooding is issued. If the state of the timing is such that it is within the predetermined time, the time of issuance is advanced and the update message includes the router's own update data and data based on the received flooding message.

As described with respect to FIG. 5, the time for issuance of an update message from a router is advanced in response to receipt of a network information or network Information update message so that the timing of issuance is synchronized to the receipt of the network information message. As a result, each of the routers 112, 114 and 117 receives the flood update message from the router 110 without any delay due to timing unit operation in the router 110. The forming of update messages in routers 112, 114 and 117 is performed as shown in FIG. 5. The receipt of the flood update message from the router 110 results in a transfer to step 515 during the repeated iteration of the loop of decision steps 507 and 513 for routers 112, 114 and 117. Accordingly, each of these routers is triggered to generate and output its own network information update messages in response to the update message received from router 110 taking into account the state of the timing unit in the router. The output of update messages from the routers 112, 114 and 117 receiving the update message from router 110 is thereby coordinated and a synchronized to improve the speed of updating of network information.

The update message from the router 114 is transmitted to router 127 in the network of FIG. 1. Router 127 operates according to the flow chart of FIG. 5 so that the router 127 generates and issues its update message responsive to receiving the update message from router 114 taking into account the state of the timing unit in the router. The other routers of the network of FIG. 1 operate in similar fashion on the basis of the flow chart of FIG. 5. Accordingly, each router is arranged to avoid delay due to its internal timing when a network information message is received and provides its output update message that is synchronized with a received message. The network information messaging of the present invention thereby provides rapid propagation of update messages through a communication network by triggering message issuance upon receiving a network information message in accordance with the state of the timing units of the routers.

In the message routing arrangement shown in FIG. 5, generation and outputting of an update message at a router occurs at internally controlled timing absent receipt of a network information message that triggers flooding. In response to a network information update message such as a routing update message from a linked neighboring router, the normal timing is advanced so that issuance is synchronized to the received network information update message. The update message formed in and issued by the router may be arranged to include network information of processors from which it has received network information messages. The combining of the network information of all these routers in the issued update message speeds up the propagation of the network information among the routers even further.

Figure 6:
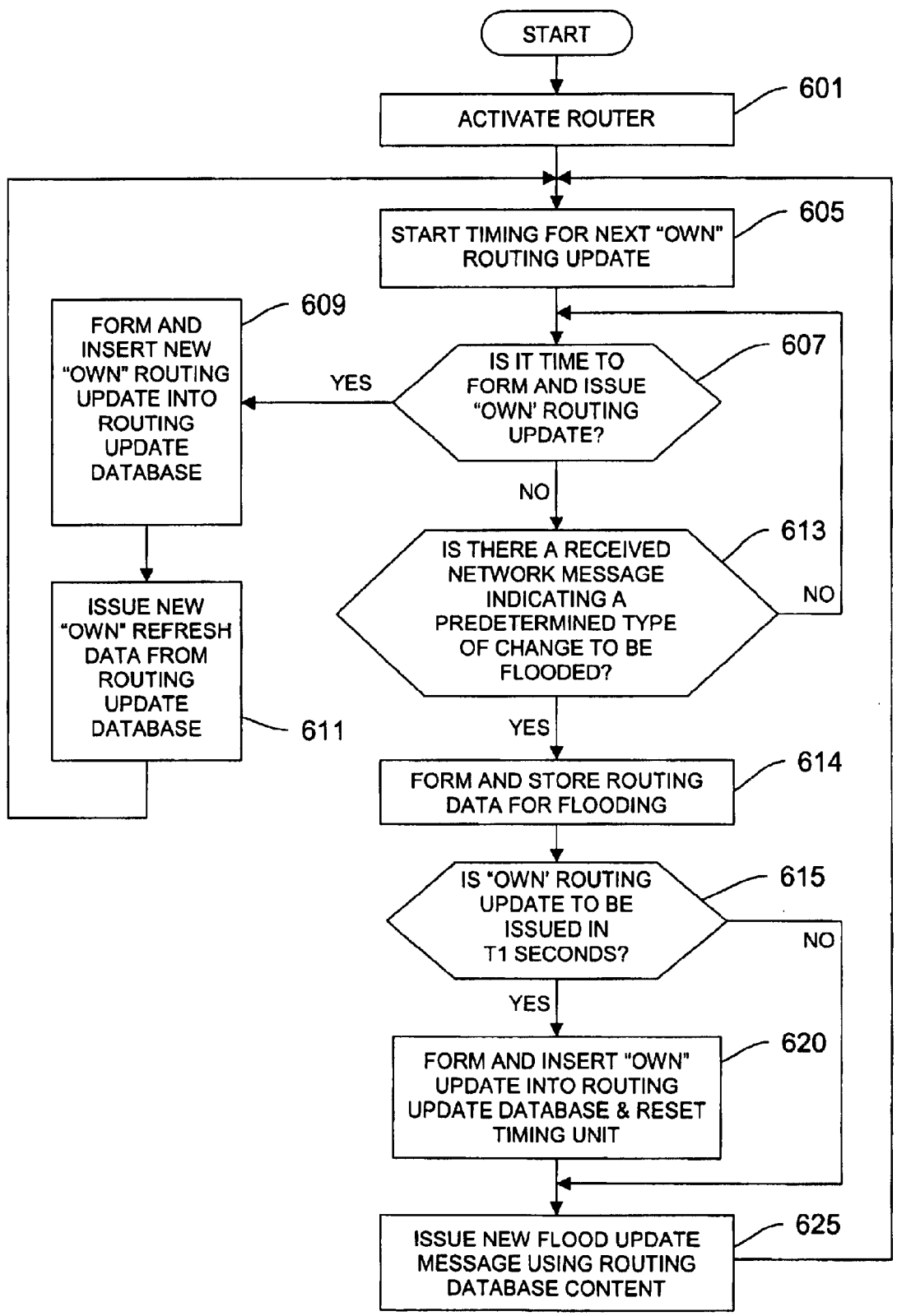
FIG. 6 depicts a flow chart illustrating a message routing arrangement according to another embodiment of the invention.

FIG. 6 illustrates an alternative message routing arrangement wherein an update message is generated and output only in response to receipt of an update message indicating a predetermined change in the network. Referring to FIG. 6, a router is activated in step 601 and the timing performed in the CPU 201 is started in step 605 as disclosed with respect to FIG. 5. The loop of steps 607 and 613 is then iterated. When the timing reaches the time for issuance of the router's own routing update, the own routing update is formed and inserted into the routing update database in step 609 and the own refresh data is issued from the routing update database in step 611. The timing is then restarted in step 605.

If an update message is received indicating a predetermined type of change in the network in step 613 during the iteration of the loop of steps 607 and 613, the routing data of the received network information message is formed and stored in the routing database in step 614. In step 615, it is decided whether the router's own routing update is to be issued within a time T of the time to form and issue the own routing update. If not, a flood update message is issued based on the content of the routing database. Detection of the router's own routing update to be issued within the time T in step 615 transfers control to step 620 in which the router's "own" update is formed and inserted into the routing update database and the timing started in step 605 is reset. Step 625 is then entered wherein the new flood update message using the routing database content is issued. Control is then returned to the timing starting step 505.

While the invention has been described by way of particular illustrative embodiments, it is to be understood that the invention is not limited to the above-described embodiments but that various changes and modifications may be made by those of ordinary skill in the art without departing from the scope and spirit of the invention. Accordingly, the foregoing embodiments should not be construed as limiting the scope of the invention which is encompassed instead by the following claims.

I claim.:

1. A network routing device comprising:
   timer for setting a time for issuing network information update messages to at least another routing device in the network according to a parameter stored in the routing device;
   a message receiver for receiving a message from at least one other routing device in the network including network information of the at least one other routing device; and
   a determiner responsive to the received message from the at least one other routing device and a state of the timer for determining the time of issuance of the network information update message, such that the time of issuance of a next network information update message is advanced and the timer is reset when a received message from at least one other routing device is received a predetermined amount of time prior to a time set by the timer.

2. A network routing device according to claim 1, wherein the time of issuance of the network information update message from the routing device is coordinated with receiving the network information message from the at least one other routing device.

3. A network routing device according to claim 1, wherein plural routing devices receive the network information message from the at least one other routing device and the times of issuance of the network information update messages from the plural routing devices are coordinated with receiving the network information message from the at least one other routing device.

4. A network routing device according to claim 1, wherein the routing device receives network information messages of a plurality of other routing devices and processes the received network information messages to form a set of parameters for controlling the operation of the routing device.

5. A network routing device according to claim 4, wherein the set of parameters includes a representation of a topology of the network.

6. A network routing device according to claim 5, wherein the network topology representation is stored in a database of the routing device.

7. A network routing device according to claim 1, wherein the determiner determines the time of issuance of the network information update message for the routing device according to information in the received network information message and the state of the timer.

8. A network routing device according to claim 1, wherein the determiner comprises a detecting unit for detecting receiving a network information message from the at least one other routing device and a decision unit for triggering generation and sending of a network information update message responsive to the detection of the receiving of the network information message prior to a next time of issuance set by the timer.

9. A network routing device according to claim 1, wherein the determiner comprises a detecting unit for detecting receiving a network information message indicating a predetermined change in network configuration from the at least one other routing device and a decision unit for triggering generation and sending of a network information update message responsive to the detection of the receiving of the network information message indicating the predetermined change in the network prior to a next time of issuance set by the timer.

10. A network routing device according to claim 1, wherein a received network information message is a network information update message.

11. A network routing device according to claim 1, wherein the network information message of the at least one other router includes network information of additional other routers.

12. A method of operating a communication network having plural routing devices coupled together comprising the steps of:
setting a timer in a first routing device to times for issuing a network information update message by the first routing device to at least another routing device in the network;
receiving a message by the first routing device from at least one other routing device in the network that includes network information of the at least one other routing device; and
determining a time of issuance of the network update message by the first routing device responsive to the received message from the at least one other routing device and a state of the timer, such that the time of issuance of a next network information update message is advanced and the timer is reset when a received message from at least one other routing device is received a predetermined amount of time prior to a time set by the timer.

13. A method according to claim 12, wherein the time of issuance of the network information update message from a routing device is coordinated with the receiving the network information message from the at least one other routing device.

14. A method according to claim 12, wherein plural routing devices receive the network information message from the at least one other routing device and times of issuance of the network information update messages from the plural routing devices are coordinated with receiving the network information message from the at least one other routing device.

15. A method according to claim 12, wherein the routing device receives network information messages of a plurality of other routing devices and processes the received network information messages to form a set of parameters for controlling the operation of the routing device.

16. A method according to claim 15, wherein the set of parameters includes a representation of a topology of the network.

17. A method according to claim 16, further comprising the step of storing the network topology representation in a database of the routing device.

18. A method according to claim 12, wherein the determining step includes determining the time of issuance of the network information updated message for the routing device according to information in the received network information message and the state of the timer.

19. A method according to claim 12, wherein the determining step comprises the steps of detecting receiving a network information message from the at least one other routing device and triggering generation and sending of a network information update message responsive to the detection of the receiving of the network information message prior to a next time of issuance set by the timer.

20. A method according to claim 12, wherein the determining step comprises the steps of detecting receiving a network information message indicating a predetermined change in network configuration from the at least one other routing device and triggering generation and sending of a network information update message responsive to the detection of the receiving of the network information message indicating the predetermined change in network configuration prior to a next time of issuance set by the timer.

21. A method according to claim 12, wherein the received network information message is a network information update message.

22. A method according to claim 12, wherein the network information message of the at least one other router includes network information of additional other routers.

23. In a communication network including plural routing devices, a network configuring system comprising:
a timer in at least at one of the plural routing devices for setting times of issuing a network information update message to at least another routing device in the network;
a message receiver in each routing device for receiving a network information message from at least one other routing device in the network; and
a determiner in the at least one of the plural routing devices responsive to the received message from the at least one other routing device and a state of the timer for determining the time of issuance of the network information update message, such that the time of issuance of a next network information update message is advanced and the timer is reset when a received message from at least one other routing device is received a predetermined amount of time prior to a time set by the timer.

24. In a communication network including plural routing devices, a network configuring system according to claim 23, wherein the time of issuance of the network information update message from the at least one routing device is coordinated with the receiving of the network information message from the at least one other routing device.

25. In a communication network including plural routing devices, a network configuring system according to claim 23, wherein plural routing devices receive the network information message from at least one other routing device and the times of issuance of the network information update messages from the plural routing devices are coordinated with the receiving of the network information message from the at least one other routing device.

26. In a communication network including plural routing devices, a network configuring system according to claim 23, wherein the at least one routing device receives network information messages of a plurality of other routing devices and processes the received network information messages to form a set of parameters for controlling the operation of the routing device.

27. In a communication network including plural routing devices, a network configuring system according to claim 26, wherein the set of parameters includes a representation of a topology of the network.

28. In a communication network including plural routing devices, a network configuring system according to claim 27, wherein the at least one routing device comprises a store for storing the network topology representation in a database of the at least one routing device.

29. In a communication network including plural routing devices, a network configuring system according to claim 23, wherein the determiner determines the time of issuance of the network information update message for the at least one routing device according to information in the received network information message and the state of the timer.

30. In a communication network including plural routing devices, a network configuring system according to claim 23, wherein the determiner comprises a detector for detecting receiving a network information message from the at least one other routing device and a decision unit for triggering generation and sending of a network information message responsive to the detection of the receiving of the network information message prior to a next time of issuance set by the timer.

31. In a communication network including plural routing devices, a network configuring system according to claim 23, wherein the determiner comprises a detector for detecting receiving a network information message indicating a predetermined change in network configuration from the at least one other routing device and a decision unit for triggering generation and sending of a network information update message responsive to the detection of the receiving of the network information message indicating the predetermined change in network configuration prior to a next time of issuance set by the timer.

32. In a communication network including plural routing devices, a network configuring system according to claim 23, wherein a received network information message is a network information update message.

33. In a communication network including plural routing devices, a network configuring system according to claim 23, wherein the network information message of the at least one other router includes network information of additional other routers.

34. In a communication network having plural routing devices coupled together, a computer usable medium in each routing device having computer readable program code units embodied therein comprising:
  a first program code unit for setting a timer in the routing device to issue a network information update message to at least another routing device in the network at times controlled according to a parameter stored in the first routing device;
  a second program code unit for receiving a message by the routing device from at least one other routing device in the network that includes network information; and
  a third program code unit for determining the time of issuance of the network update message by the routing device responsive to the received message from the at least one other routing device and a state of the timer, such that the time of issuance of a next network information update message is advanced and the timer is reset-when a received message from at least one other routing device is received a predetermined amount of time prior to a time set by the timer.

35. In a communication network having plural routing devices coupled together, a computer usable medium in each routing device having computer readable program code units embodied therein according to claim 34, wherein the third program code unit determines the time of issuance of the network information update message from a routing device to be coordinated with the receiving of the network information message from the at least one other routing device.

36. In a communication network having plural routing devices coupled together, a computer usable medium in each routing device having computer readable program code units embodied therein according to claim 34, wherein plural routing devices receive the network information message from at least one other routing device and the times of issuance of the network information update messages from the plural routing devices are determined by the third program code unit to coordinate the times of issuance with the of the network information message from the at least one other routing device.

37. In a communication network having plural routing devices coupled together, a computer usable medium in each routing device having computer readable program code units embodied therein according to claim 34, further comprising a fourth program code unit for processing the received network information message to form a set of parameters for controlling the operation of the routing device.

38. In a communication network having plural routing devices coupled together, a computer usable medium in each routing device having computer readable program code units embodied therein according to claim 37, wherein the set of parameters includes a representation of a topology of the network.

39. In a communication network having plural routing devices coupled together, a computer usable medium in each routing device having computer readable program code units embodied therein according to claim 38, further comprising a fifth program code unit for storing the network topology representation in a database of the routing device.

40. In a communication network having plural routing devices coupled together, a computer usable medium in each routing device having computer readable program code units embodied therein according to claim 34, wherein the third program code unit includes a program code unit for determining the time of issuance of the network information updated message for the routing device according to information in the received network information message and the state of the timing.

41. In a communication network having plural routing devices coupled together, a computer usable medium in each routing device having computer readable program code units embodied therein according to claim 34, wherein the third program code unit comprises a program code unit for detecting receiving a network information message from the at least one other routing device and a program code unit for triggering generation and sending of a network information message responsive to the detection of the receiving of the network information message prior to a next time of issuance set by the timer.

42. In a communication network having plural routing devices coupled together, a computer usable medium in each routing device having computer readable program code units embodied therein according to claim 34, wherein the third program code unit comprises a program code unit for detecting and receiving a network information message indicating a predetermined change in network configuration from the at least one other routing device and a program code unit for triggering generation and sending of a network information update message responsive to the detection of the receiving of the network information message indicating the predetermined change in network configuration prior to a next time of issuance set by the timer.

43. In a communication network having plural routing devices coupled together, a computer usable medium in each routing device having computer readable program code units embodied therein according to claim 34, wherein a received network information message is a network information update message.

44. In a communication network having plural routing devices coupled together, a computer usable medium in each routing device having computer readable program code units embodied therein according to claim 34, wherein the network information message of the at least one other router includes network information of additional other routers.

45. A network routing device comprising:

means for setting a time for issuing network information update messages to at least another routing device in the network according to a parameter stored in the routing device;

means for receiving a message from at least one other routing device in the network including network information of the at least one other routing device; and means responsive to the received message from the at least one other routing device and a state of the time setting means for determining the time of issuance of the network information update message, such that the time of issuance of a next network information update message is advanced and the time setting means is reset when a received message from at least one other routing device is received a predetermined amount of time prior to a time set by the time setting means.

* * * * *

UNITED STATES PATENT AND TRADEMARK OFFICE
CERTIFICATE OF CORRECTION

PATENT NO. : 6,775,709 B1
DATED : August 10, 2004
INVENTOR(S) : Brig Barnum Elliot It is certified that error appears in the above-identified patent and that said Letters Patent is hereby corrected as shown below:

Column 11,
Line 51, change "reset-when" to -- reset when --

Signed and Sealed this

Twenty-eighth Day of September, 2004

JON W. DUDAS
*Director of the United States Patent and Trademark Office*